United States Patent
Yoon et al.

(10) Patent No.: US 8,121,553 B2
(45) Date of Patent: Feb. 21, 2012

(54) APPARATUS AND METHOD FOR DETERMINING CHANNEL QUALITY INDICATOR (CQI) USING BEAMFORMING IN MULTI-ANTENNA SYSTEM

(75) Inventors: Eun-Chul Yoon, Yongin-si (KR); Yun-Seok Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 573 days.

(21) Appl. No.: 12/322,586

(22) Filed: Feb. 4, 2009

(65) Prior Publication Data

US 2009/0215401 A1     Aug. 27, 2009

(30) Foreign Application Priority Data

Feb. 4, 2008    (KR) .......................... 10-2008-0011273

(51) Int. Cl.
*H04B 17/00*     (2006.01)

(52) U.S. Cl. ............... 455/67.14; 455/67.11; 455/115.4; 375/267

(58) Field of Classification Search ..................... None
See application file for complete search history.

(56) References Cited

U.S. PATENT DOCUMENTS

| | | |
|---|---|---|
| 7,426,232 B2 * | 9/2008 | Matsuoka et al. ............ 375/148 |
| 2002/0085653 A1 * | 7/2002 | Matsuoka et al. ............ 375/347 |
| 2007/0211823 A1 * | 9/2007 | Mazzarese et al. ........... 375/267 |
| 2008/0153428 A1 * | 6/2008 | Han et al. ....................... 455/69 |

* cited by examiner

*Primary Examiner* — Howard Williams

(57) ABSTRACT

An apparatus and a method for determining a Channel Quality Indicator (CQI) using a beamforming in a multi-antenna system are provided. A transmitter for determining a CQI based at least partly upon the beamforming in the multi-antenna system includes a beam former for distinguishing frequency tone intervals having a constant channel across an entire frequency tone, forming a beam by multiplying frequency tones of the frequency tone interval having the constant channel by different beamforming weights, and transmitting a preamble signal. Hence, the users can be scheduled based at least partly upon the beamforming gain, and throughput can be enhanced through the practical MCS selection.

21 Claims, 6 Drawing Sheets

APPARATUS AND METHOD FOR DETERMINING CHANNEL QUALITY INDICATOR (CQI) USING BEAMFORMING IN MULTI-ANTENNA SYSTEM

CROSS-REFERENCE TO RELATED APPLICATION(S) AND CLAIM OF PRIORITY

The present application claims the benefit under 35 U.S.C. §119(a) to a Korean patent application filed in the Korean Intellectual Property Office on Feb. 4, 2008 and assigned Serial No. 10-2008-0011273, the entire disclosure of which is hereby incorporated by reference.

TECHNICAL FIELD OF THE INVENTION

The present invention relates generally to a multi-antenna system. More particularly, the present invention relates to an apparatus and a method for determining a channel quality information based at least partly upon beamforming.

BACKGROUND OF THE INVENTION

Future mobile and wireless communication systems are demanding even faster data transmission and greater system capacity than present-day systems. To meet those demands, research is being conducted on techniques for transmitting and receiving data via multiple antennas. One of the transmission and reception techniques using the multiple antennas is a beamforming which focuses the beam of the transmit or receive antenna only upon a corresponding terminal.

FIG. 1 illustrates a beamforming data transmission of a conventional multi-antenna system.

In the multi-antenna system of FIG. 1, a base station transmits a preamble signal via multiple antennas and a terminal measures Channel Quality Indicator (CQI), such asquantized preamble Carrier-to-Interference-plus-Noise-Ratio (CINR) information, using the preamble signal and feeds the measured CQI back to the base station. The base station selects a Modulation and Coding Scheme (MCS) for a downlink using the feedback CQI information. Currently, equal weight is applied in sending the preamble signal.

With equal weight in the preamble signal transmission, a transmit beam power pattern 100 is spatially formed at right angles to the antenna array. Particularly, FIG. 1 shows the spatial beam power pattern of the waves including a specific frequency tone. When the channel is in Line-Of-Sight (LOS) range, user terminals receiving the strong preamble signal are subject to the spatial restriction. Even when the beam direction of the preamble does not face a user terminal 120, the user 120 of the strong channel strength is highly likely to report a small CQI to the base station. For example, while the second user 120 has a stronger channel strength than a first user 110 in terms of the distance, the beam direction of the preamble signal is consistent with the first user 110, and thus the second user 120 feeds a smaller CQI than the first user 110 to the base station.

Hence, it is highly likely to exclude the users 120 of the spatially inconsistent beam direction of the preamble signal, from the scheduling. Even when the user 120 is scheduled and assigned the higher MCS level, a lower MCS may be probably allocated to the user 120. Those problems become more serious for the lower-speed channel and greater number of the transmit antennas. Also, those problems degrade fairness of the data delivery and lower the data rate of the entire system.

To address those shortcomings, a Cyclic Delay Diversity (CDD) can be considered. CDD, which is one of signal transmission methods in a space-time domain, transmits data using multiple antennas by sending the signal over a first antenna without delay, sending the signal delayed by $\Delta$ via the second antenna, sending the signal delayed by $2\Delta$ via the third antenna, and sending the signal delayed by $(m-1)\Delta$ via the m-th antenna. When the signal is delayed by $(m-1)\Delta$, the phase of the signal changes by $$e^{-j\frac{2\pi k}{N}(m-1)\Delta}$$

in the k-th frequency tone. This signal phase change spatially alters the beam direction in the k-th frequency tone.

Since CDD forcibly generates the delays, the maximum delay of the multi-path increases far more. In the design of an Orthogonal Frequency Division Multiplexing (OFDM) system, a length of a Cyclic Prefix (CP) is usually greater than the maximum delay of the multi-path in order to avoid Inter-Symbol Interference (ISI). However, when CDD is adopted, the maximum delay interval of the multi-path is longer than the CP and thus causes ISI. As the number of the transmit antennas increases, the performance using CDD further deteriorates. The CQI acquired at the base station by receiving the preamble signal using CDD somewhat differs from the total strength of the actual channel of the terminal. As the frequency tone index increases, CDD slowly rotates the preamble beam in the space. Fast rotation increases the delay and causes ISI, and slow rotation disables the accurate measurement of the strength of the entire channel of the frequency tones.

SUMMARY OF THE INVENTION

To address the above-discussed deficiencies of the prior art, it is a primary aspect of the present invention to address at least the above mentioned problems and/or disadvantages and to provide at least the advantages described below. Accordingly, an aspect of the present invention is to provide an apparatus and a method for efficiently determining a Channel Quality Indicator (CQI) level based at least partly upon beamforming in a multi-antenna system.

According to one aspect of the present invention, a transmitter for determining a CQI based at least partly upon a beamforming in a multi-antenna system includes a beam former for distinguishing frequency tone intervals having a constant channel coefficient across an entire frequency tone, forming a beam by multiplying frequency tones of the frequency tone interval having the constant channel coefficient by different beamforming weights, and transmitting a preamble signal.

According to another aspect of the present invention, a receiver for determining a CQI based at least partly upon a beamforming in a multi-antenna system includes a detector for estimating a channel vector by receiving a preamble signal beamformed by multiplying frequency tones of a frequency tone interval having a constant channel coefficient by different beamforming weights; and a CQI calculator for calculating channel powers in the frequency tones carrying the preamble signal, calculating an arithmetic average, and quantizing a product of the arithmetic average and a number of transmit antennas.

According to yet another aspect of the present invention, a method for determining a CQI based at least partly upon a beamforming in a multi-antenna system includes distinguishing frequency tone intervals having a constant channel coefficient across an entire frequency tone; forming a beam by multiplying frequency tones of the frequency tone interval having the constant channel coefficient by different beamforming weights; and transmitting a preamble signal through the formed beam.

According to still another aspect of the present invention, a method for determining a CQI based at least partly upon a beamforming in a multi-antenna system includes estimating a channel vector by receiving a preamble signal beamformed by multiplying frequency tones of a frequency tone interval having a constant channel coefficient by different beamforming weights; and calculating channel powers in the frequency tones carrying the preamble signal, calculating an arithmetic average, and quantizing a product of the arithmetic average and a number of transmit antennas.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 2 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

Exemplary embodiments of the present invention provide an apparatus and a method for determining a Channel Quality Indicator (CQI) based at least partly upon beamforming in a multi-antenna system.

Figure 1:
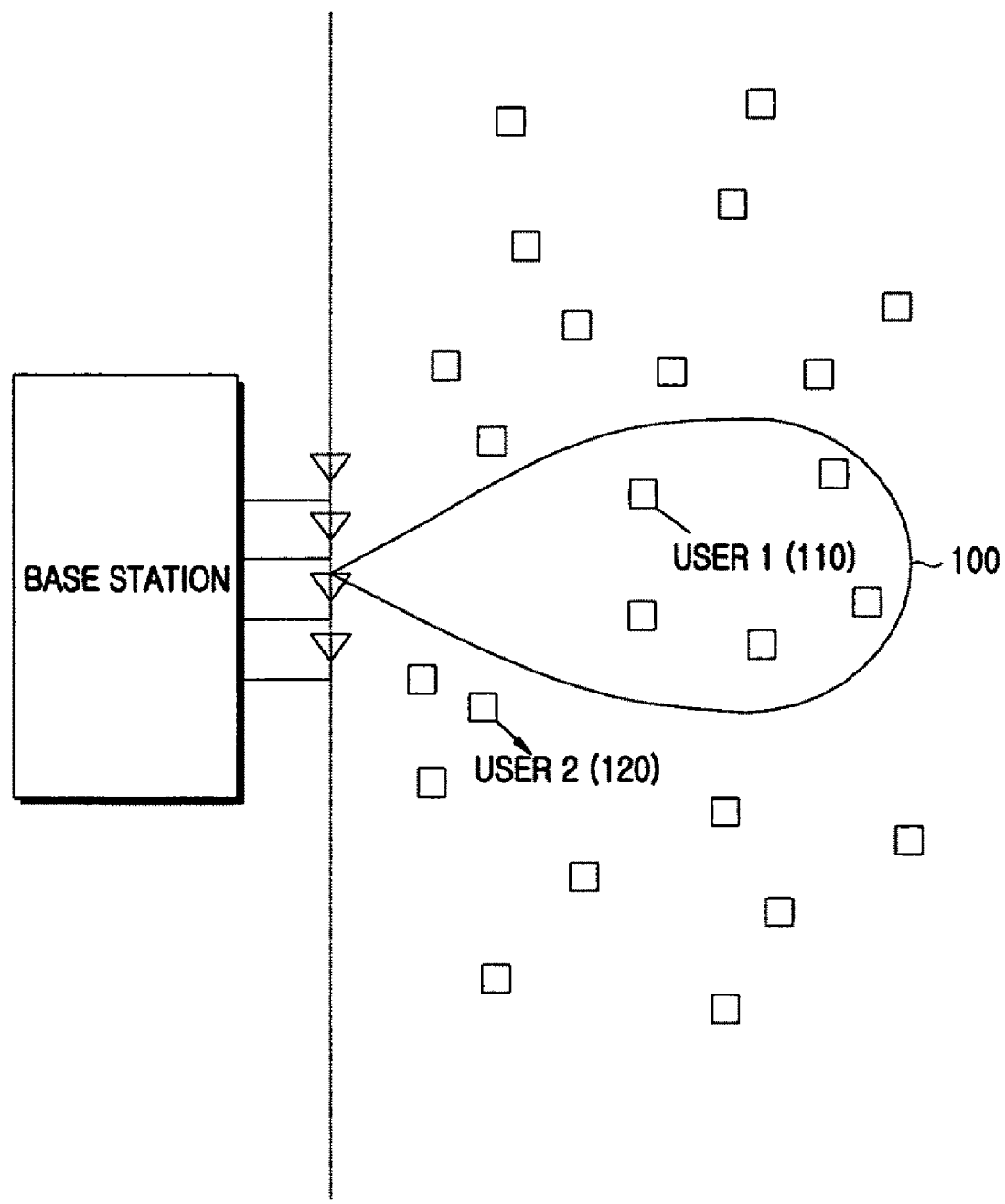
FIG. 1 illustrates a beamforming data transmission of a conventional multi-antenna system.
Figure 2:
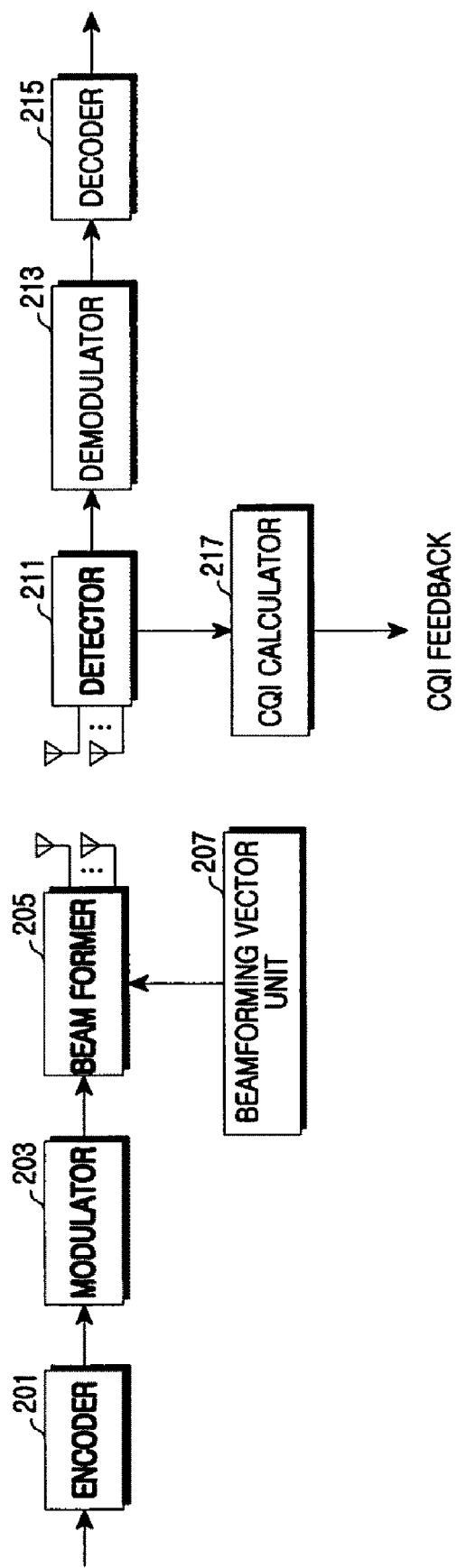
FIG. 2 illustrates a transmitter and a receiver for determining a Channel Quality Indicator (CQI) based at least partly upon beamforming in a multi-antenna system according to an exemplary embodiment of the present invention.

FIG. 2 is a block diagram of a transmitter and a receiver for determining the CQI based on the beamforming in a multi-antenna system according to an exemplary embodiment of the present invention.

The transmitter of FIG. 2 includes an encoder 201, a modulator 203, a beam former 205, and a beamforming vector unit 207. The receiver includes a detector 211, a demodulator 213, a decoder 215, and a CQI calculator 217.

The encoder 201 of the transmitter encodes input signals at a certain code rate and outputs the coded symbols to the modulator 203. For example, the encoder 201 can be implemented using a convolutional encoder, a turbo encoder, and a Low Density Parity Check (LDPC) encoder. The modulator 203 modulates the input coded symbols output from the encoder 201 according to a certain modulation scheme and outputs the modulated symbols to the beam former 205. For example, the modulation scheme includes Binary Phase Shift Keying (BPSK) which maps one bit (s=1) to one complex signal, Quadrature Phase Shift Keying (QPSK) which maps two bits (s=2) to one complex signal, 8-ary Quadrature Amplitude Modulation (8QAM) which maps three bits (s=3) to one complex signal, and 16QAM which maps four bits (s=4) to one complex signal.

Herein, the modulation scheme and the code rate are determined by a CQI value or a Carrier-to-Interference-plus-Noise-Ratio (CINR) value fed back from the terminal.

The beam former 205 duplicates the modulation symbol output from the modulator 203 as many as the number of antennas, multiplies the duplicated signals by the calculated beamforming weight, and outputs the signals via the corresponding antennas. That is, the beam former 205 forms a transmit beam using the beamforming weight and outputs the transmit signals in the direction of the formed transmit beam.

Particularly, the beam former 205 receives a set of beamforming vectors used in the preamble from the beamforming vector unit 207, determines a frequency tone interval of a constant channel coefficient across the entire frequency tone, and then transmits the preamble signal by multiplying the transmit antenna by the weight vector of the beamforming vector set in the frequency tone interval of the constant channel coefficient.

Figure 6:
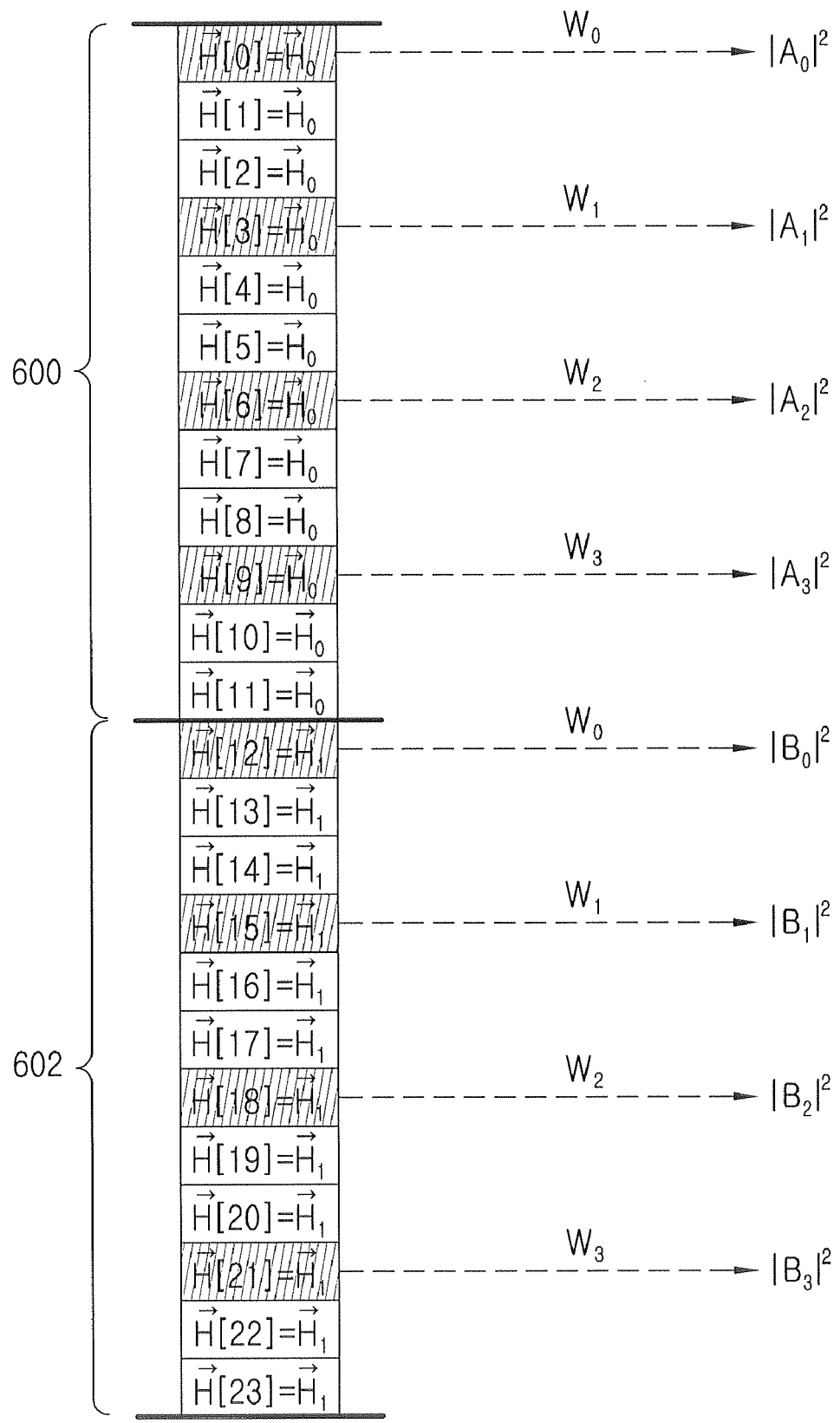
FIG. 6 illustrates the beamforming of a preamble in 24 frequency tones according to an exemplary embodiment of the present invention.

FIG. 6 illustrates the preamble beamforming in the frequency tones according to an exemplary embodiment of the present invention.

To transmit the preamble to a plurality of terminals, the transmitter of the base station sends the signals not using the entire frequency tone but using every third tone in order to transfer the preamble signals without interference based on three sectors. Typically, in Orthogonal Frequency Division Multiplexing (OFDM), the channel of neighbor frequency tones has high correlation. Particularly, when the terminal moves slowly, the channel sustains the high correlation with the greater number of the neighbor frequency tones. Given the beamforming using the base station including four transmit antennas in the Institute of Electrical and Electronics Engineers (IEEE) 802.16e standard, it is assumed that the channel is constant in 12 frequency tones. That is, when the equal beamforming weight is applied in the 12 neighbor frequency tones, considerable performance degradation is not caused. Thus, it is assumed that the channel coefficient does not change within 12 tones in the preamble signal transmission.

Given four transmit antennas in the base station, 12 (=4×3) frequency tones are required to apply the orthogonal beamforming weight vectors four times based upon three sectors. Since the number of the necessary frequency tones is equal to the number of the neighbor frequency tones (=12) of the constant-valued channel, it is assumed that the frequency channel is the same value until the orthogonal beamforming weight vectors are applied four times. When the preamble signal is transmitted by applying the different orthogonal beamforming weight vectors through four frequency tones skipping over three, the entire orthogonal weight vector is applied in the same channel. Consequently, the acquired CQI can represent the accurate intensity of the channel applying the beamforming to the 12 frequency tones. By contrast, the conventional method applies the equal beamforming vector to every frequency tone, and thus the acquired CQI cannot represent the accurate intensity of the channel with the beamforming applied.

The beamforming vector unit 207 generates the spatially orthogonal beamforming weight vectors used in the preamble and provides the vectors to the beam former 205 if necessary. As an example of the set of the spatially orthogonal beamforming weights, $M_T \times 1$ beamforming weights can be given by Equation 1:

$$w_0 = \frac{1}{\sqrt{M_T}} \begin{bmatrix} e^{j\pi \times \frac{2}{M_T} \times 0 \times 0}, e^{j\pi \times \frac{2}{M_T} \times 0 \times 1}, \\ \ldots, e^{j\pi \times \frac{2}{M_T} \times 0 \times (M_T-1)} \end{bmatrix}^T \quad \text{[Eqn. 1]}$$

$$w_1 = \frac{1}{\sqrt{M_T}} \begin{bmatrix} e^{j\pi \times \frac{2}{M_T} \times 1 \times 0}, e^{j\pi \times \frac{2}{M_T} \times 1 \times 1}, \\ \ldots, e^{j\pi \times \frac{2}{M_T} \times 1 \times (M_T-1)} \end{bmatrix}^T$$

$$\vdots$$

$$w_{M_T-1} = \frac{1}{\sqrt{M_T}} \begin{bmatrix} e^{j\pi \times \frac{2}{M_T} \times (M_T-1) \times 0}, e^{j\pi \times \frac{2}{M_T} \times (M_T-1) \times 1}, \\ \ldots, e^{j\pi \times \frac{2}{M_T} \times (M_T-1) \times (M_T-1)} \end{bmatrix}^T$$

In Equation 1, $(\bullet)^T$ denotes a vector transpose operation.

To ease the understanding, it is assumed that the number of the transmit antennas $M_T$ of the base station is 4. The set of the spatially orthogonal beamforming weights corresponding to the number of the antennas can be calculated easily in the similar manner. Note that the beamforming weight vectors should meet the property of Equation 2:

$$w_i^H w_j = \begin{cases} 1 & \text{if } i = j \\ 0 & \text{if } i \neq j. \end{cases} \quad \text{[Eqn. 2]}$$

In Equation 2, $w_i$ denotes the i-th beamforming weight vector, $w_j$ denotes the j-th beamforming weight vector, and $(\bullet)^H$ denotes a Hermitian operation.

Figure 5:
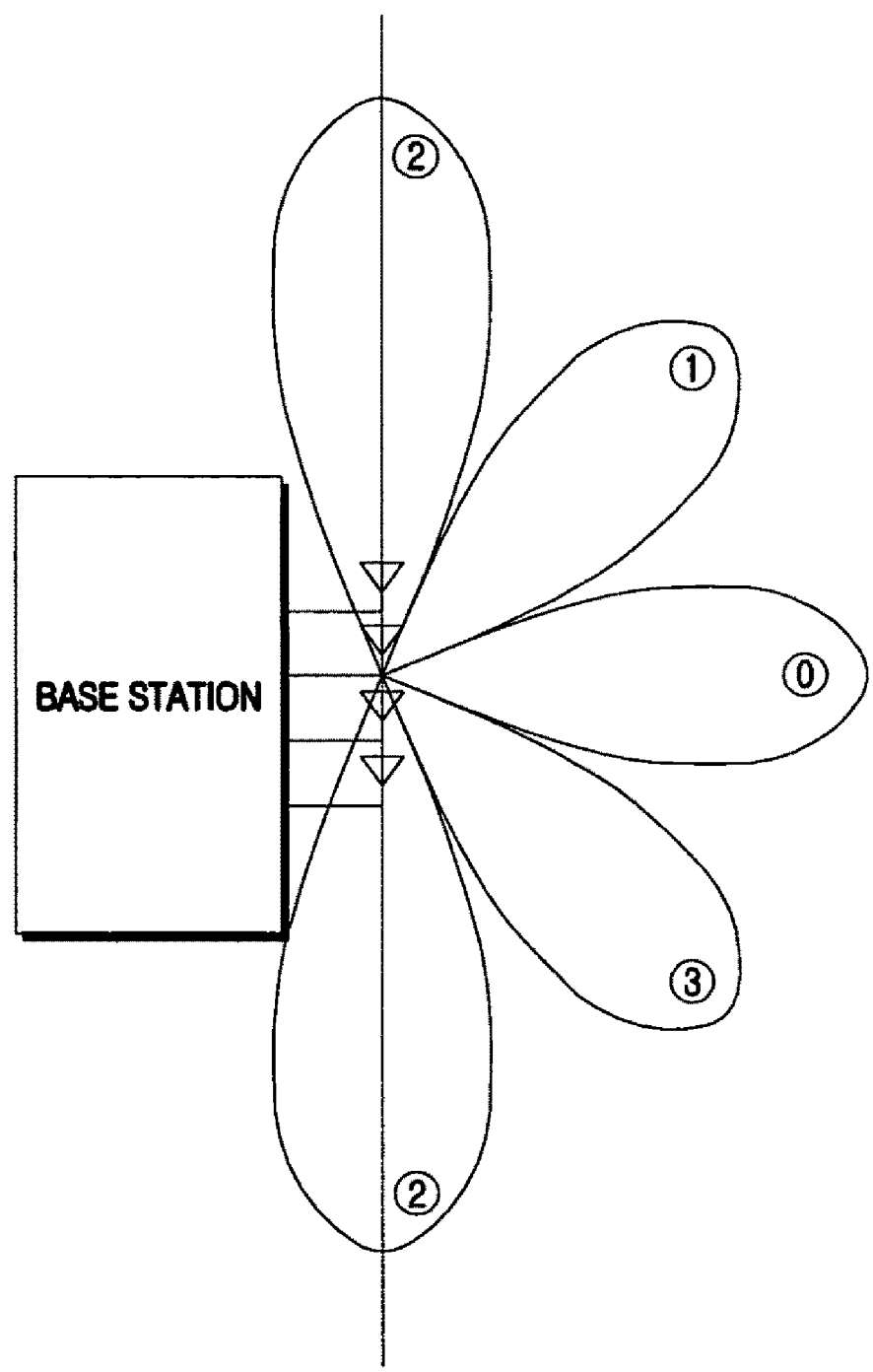
FIG. 5 illustrates a power pattern of four orthogonal beams with four transmit antennas according to an exemplary embodiment of the present invention.

FIG. 5 depicts a spatial power pattern of four orthogonal beams with four transmit antennas according to an exemplary embodiment of the present invention. Herein, it is assumed that a distance between the transmit antennas is wavelength ($\lambda/2$).

When the beamforming weight vector $w_0$ of Equation 1 is used, the beam ⓞ is formed. When the beamforming weight vector $w_1$ is used, the beam ① is formed. When the beamforming weight vector $w_2$ is used, the beam ② is formed. When the beamforming weight vector $w_3$ is used, the beam ③ is formed.

When the preamble is transmitted in 24 frequency tones in total, FIG. 6 depicts the beamforming of the preamble signal. Given four transmit antennas in the IEEE 802.16e standard, the channel coefficient in 12 frequency tones is assumed to be constant-valued.

In FIG. 6, intervals 600 and 602 of 12 frequency tones each have the constant channel value $\vec{h}_0$ and $\vec{h}_1$ ($1 \times M_T$ vector). In the first frequency tone interval 600 based on the three sectors, the 0-th frequency tone is multiplied by the beamforming weight vector $w_0$, the third frequency tone is multiplied by the beamforming weight vector $w_1$, the sixth frequency tone is multiplied by the beamforming weight vector $w_2$, and the ninth frequency tone is multiplied by the beamforming weight vector $w_3$. In the second frequency tone interval 602, the twelfth frequency tone is multiplied by the beamforming weight vector $w_0$, the fifteenth frequency tone is multiplied by the beamforming weight vector $w_1$, the eighteenth frequency tone is multiplied by the beamforming weight vector $w_2$, and the twenty-first frequency tone is multiplied by the beamforming weight vector $w_3$.

The detector 211 of the receiver estimates the channel using the beamformed preamble signal received via the receive antennas, detects the receive symbols, and outputs the detected receive symbols to the demodulator 213. The detector 211 provides the estimated channel $\vec{h}_0$ and $\vec{h}_1$ to the CQI calculator 217.

A linear summation of the basis vectors ($w_i$ is $M_T \times 1$ vector) orthogonal to the channel vector can be expressed as Equation 3:

$$\vec{h} = a_0 w_0^H + a_1 w_1^H + a_2 w_2^H + a_3 w_3^H. \quad \text{[Eqn. 3]}$$

Using the orthogonality of $\{w_i\}$, a complex constant $\{a_i\}$ can be expressed as Equation 4:

$$a_i = \vec{h} \cdot w_i \text{ for } i = 0, 1, 2, 3. \quad \text{[Eqn. 4]}$$

In Equation 4, $\vec{h}$ denotes the $1 \times M_T$ channel vector, $a_i$ denotes a channel coefficient for the i-th frequency tone, $w_i$ denotes the i-th beamforming weight vector, and $(\bullet)^H$ denotes the Hermitian operation.

When the base station uses the weight vector $w_i$ to transmit the preamble signal using one frequency tone, the terminal can estimate the channel status as a value proportional to $|a_i|^2 (= |\vec{h} \cdot w_i|^2)$. When the different weights are applied to the four neighbor tones, the CQI calculator 217 can calculate the constant channel intensity $|h|^2 = |\vec{h} \cdot w_0|^2 + |\vec{h} \cdot w_1|^2 + |\vec{h} \cdot w_2|^2 + |\vec{h} \cdot w_3|^2$ in the neighbor frequency tones.

$\vec{h}_0$ and $\vec{h}_1$ can be expressed as Equation 5:

$$\vec{h}_0 = a_0 w_0^H + a_1 w_1^H + a_2 w_2^H + a_3 w_3^H$$

$$\vec{h}_1 = b_0 w_0^H + b_1 w_1^H + b_2 w_2^H + b_3 w_3^H. \quad \text{[Eqn. 5]}$$

In Equation 5, $\vec{h}_0$ denotes the channel vector for the first frequency tone interval 600, $\vec{h}_1$ denotes the channel vector for the second frequency tone interval 602, $a_i$ denotes the channel coefficient for the i-th frequency tone in the first frequency tone interval 600, $b_i$ denotes the channel coefficient for the i-th frequency tone in the second frequency tone interval 602, $w_i$ denotes the i-th beamforming weight vector, and $(\bullet)^H$ denotes the Hermitian operation.

The implementation of the preamble signal transmission with the orthogonal weight applied is simpler than that of a Cyclic Delay Diversity (CDD). The CDD is implemented by varying the phase in the frequency domain so as to realize the different phase in each frequency tone. By contrast, since the preset orthogonal weight is just applied to the frequency tone, there is no need to separately calculate the phase. Determining which beamforming weight is applied merely takes into account the fact that the preamble signal is transmitted in every third tone in the frequency domain.

The demodulator 213 demodulates the receive symbols output from the detector 211 using a certain demodulation scheme and outputs the demodulated symbols to the connected decoder 215. The decoder 215 restores the original signal by decoding the demodulated symbols output from the demodulator 213 at a certain decode rate.

The CQI calculator 217 calculates a CINR using the estimated channel information $\vec{h}_0$ and $\vec{h}_1$ provided by the detector 211 and feeds back the CINR to the transmitter.

It is assumed that the preamble signal is carried in the frequency tones having the frequency tone index 3m (for m=0, 1, 2, 3, 4, 5, 6, 7). The terminal calculates and sums up the channel powers of the frequency tones carrying the preamble signal, and divides the sum by the number of the frequency tones delivering the preamble signal. The resulting CINR is given by Equation 6:

$$CINR = \frac{|a_0|^2 + |a_1|^2 + |a_2|^2 + |a_3|^2 + |b_0|^2 + |b_1|^2 + |b_2|^2 + |b_3|^2}{8} \quad [\text{Eqn. 6}]$$
$$= \frac{\|\vec{h}_0\|^2 + \|\vec{h}_1\|^2}{8}.$$

Herein, it is assumed that a power sum of noise and interference signal is 1. The given result is 1/4 times the power average of the per tone channel. To obtain the correct average power of the per tone channels, the resultant value of Equation 6 should be multiplied by 4, which is the number of the antennas. The finally acquired per tone CINR is given by Equation 7:

$$CINR = \frac{\|\vec{h}_0\|^2 + \|\vec{h}_1\|^2}{2}. \quad [\text{Eqn. 7}]$$

CINR is the average CINR which adds up the channel status of the entire frequency tone when the beamforming is applied.

The terminal needs to acquire the CQI (=the quantized information of the CINR) by calculating the channel powers in the frequency tones carrying the preamble, arithmetically averaging the channel powers, and multiplying by $M_T$. When the power sum of the noise and the interference signal is not 1, the CINR is acquired after dividing by the power sum. Herein, for brevity, it is assumed that the power sum of the noise and the interference signal is 1. When the $M_T$-ary orthogonal weights are applied to the $M_T$-ary preamble signals, the $M_T$ is multiplied because the power for one channel vector ($1*M_T$) is acquired only by summing up all of the calculated channel powers in the $M_T$-ary frequency tones. The arithmetic average is produced by summing up the $M_T$-ary channel powers calculated in the $M_T$-ary frequency tones and dividing the summation by $M_T$. After multiplying the arithmetic average by $M_T$, the power for the single channel vector is produced.

The conventional CINR acquired when the preamble using the equal weight and the preamble signal using the CDD are transmitted is not the average CINR which gathers the channel status of the entire frequency tone with the beamforming applied. The conventional CINR makes the wrong determination in the scheduling or in the MCS selection and thus degrades the data rate of the system.

Figure 3:
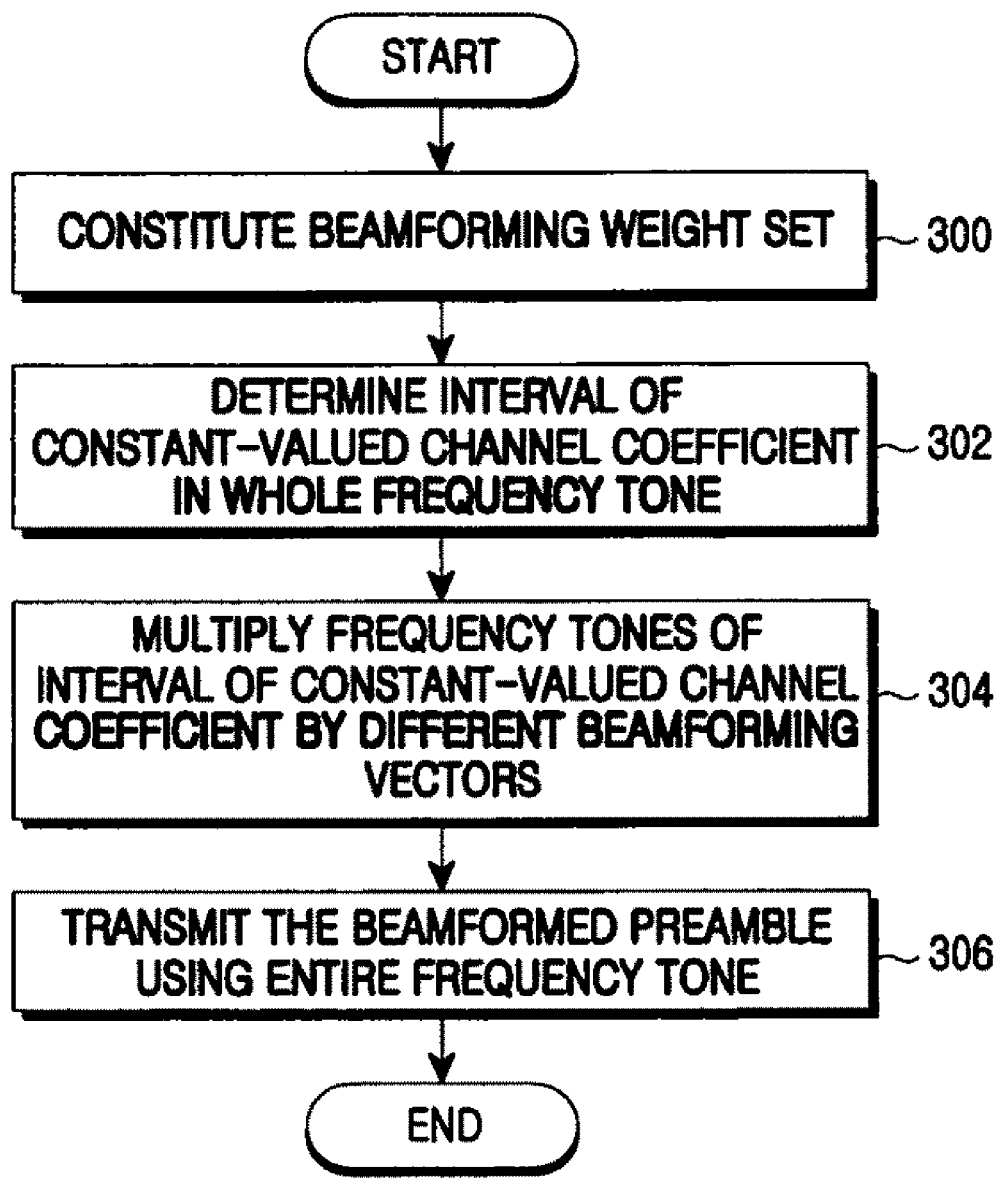
FIG. 3 illustrates operations of a base station for determining the CQI in the multi-antenna system according to an exemplary embodiment of the present invention.

FIG. 3 is a flowchart outlining operations of the base station for determining the CQI in the multi-antenna system according to an exemplary embodiment of the present invention.

In step 300, the base station constitutes the orthogonal beamforming vector set (see Equation 1).

In step 302, the base station determines the frequency tone interval having the constant-valued channel coefficient across the entire frequency tone. For example, when four transmit antennas are employed according to the IEEE 802.16e standard, it is assumed that 12 frequency tones are constant-valued channel coefficient.

In step 304, the base station multiplies every frequency tone of the frequency tone interval having the constant-valued channel coefficient, by different beamforming vectors. In FIG. 6, the preamble is beamformed in 24 frequency tones.

In step 306, the base station transmits the beamformed preamble signal.

Next, the base station finishes the process of determining the CQI.

Figure 4:
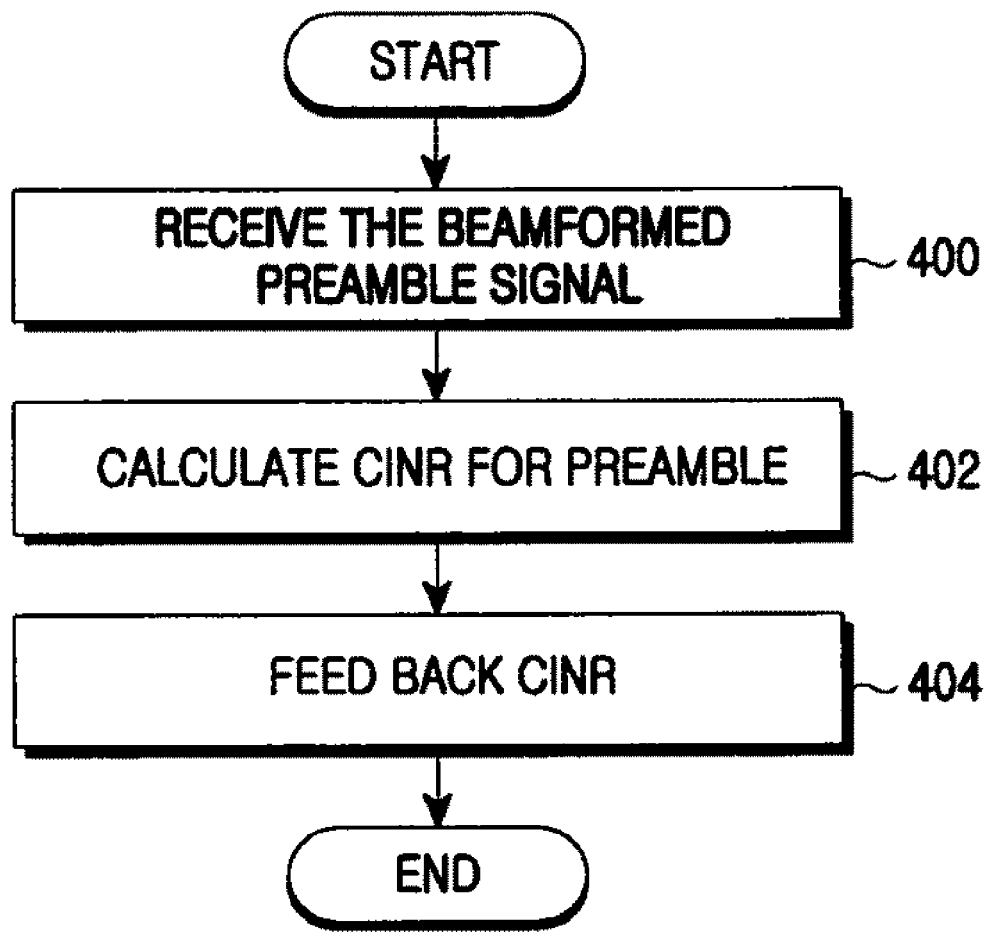
FIG. 4 illustrates operations of a terminal for determining the CQI in the multi-antenna system according to an exemplary embodiment of the present invention.

FIG. 4 is a flowchart outlining operations of the terminal for determining the CQI in the multi-antenna system according to an exemplary embodiment of the present invention.

In step 400, the terminal receives the beamformed preamble signal.

In step 402, the terminal calculates the channel powers of the frequency tones carrying the preamble signal, arithmetically averages the channel powers, multiples the average by the transmit antennas, and quantizes the product.

In step 404, the terminal feeds back the CINR in a feedback channel.

As set forth above, in the multi-antenna system, the preamble signal is transmitted spatially in difference directions over the frequency tones. Therefore, the users can be scheduled based at least partly upon the beamforming gain, multi-user diversity gain and scheduling fairness can be achieved, and throughput can be enhanced through the practical MCS selection.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A transmitter for determining a Channel Quality Information (CQI) based at least partly upon a beamforming in a multi-antenna system, the transmitter comprising:
a beam former for distinguishing frequency tone intervals having a constant channel coefficient across an entire frequency tone, forming a beam by multiplying frequency tones of the frequency tone interval having the constant channel coefficient by different beamforming weights.

2. The transmitter of claim 1, further comprising:
a beamforming vector unit for generating a set of the beamforming weights.

3. The transmitter of claim 2, wherein the beamforming weights have orthogonality.

4. The transmitter of claim 1, wherein, to form the beam by multiplying the frequency tones of the frequency tone interval having the constant channel by the different beamforming weights, the beam is formed by multiplying one tone skipping every third tone by the beamforming weight according to a preset rule when the preamble is transmitted based on three sectors.

5. A receiver for determining a Channel Quality Indicator (CQI) based at least partly upon a beamforming in a multi-antenna system, comprising:
a detector for estimating a channel vector by receiving a preamble signal beamformed by multiplying frequency tones of a frequency tone interval having a constant channel coefficient by different beamforming weights; and
a CQI calculator for calculating channel powers in the frequency tones carrying the preamble signal, calculating an arithmetic average, and quantizing a product of the arithmetic average and a number of transmit antennas.

6. The receiver of claim 5, wherein the channel vector is a linear summation of orthogonal basis vectors and given by the following equation:

$$\vec{h} = a_0 w_0^H + a_1 w_1^H + a_2 w_2^H + a_3 w_3^H + \ldots + a_i w_i^H,$$

where $\vec{h}$ denotes the channel vector, $a_i$ denotes a channel coefficient for an i-th frequency tone carrying the preamble signal, $w_i$ denotes an i-th beamforming weight vector, and $(\cdot)^H$ denotes a Hermitian operation.

7. The receiver of claim 6, wherein, using orthogonality of $\{w_i\}$, a complex constant $\{a_i\}$ is given by the following equation:

$$a_i = \vec{h} \cdot w_i \text{ for } i=0, 1, 2, 3,$$

where $\vec{h}$ denotes the channel vector, $a_i$ denotes a channel coefficient for an i-th frequency tone carrying the preamble signal, and $w_i$ denotes an i-th beamforming weight vector.

8. A method for determining a Channel Quality Indicator (CQI) based at least partly upon a beamforming in a multi-antenna system, the method comprising:
distinguishing frequency tone intervals having a constant channel coefficient across an entire frequency tone;
forming a beam by multiplying frequency tones of the frequency tone interval having the constant channel coefficient by different beamforming weights; and
transmitting a preamble signal through the formed beam.

9. The method of claim 8, further comprising:
generating a set of the beamforming weights.

10. The method of claim 9, wherein the beamforming weights have orthogonality.

11. The method of claim 8, wherein, to form the beam by multiplying the frequency tones of the frequency tone interval having the constant channel by the different beamforming weights, the beam is formed by multiplying one tone skipping every third tone by the beamforming weight according to a preset rule when the preamble is transmitted based on three sectors.

12. A method for determining a Channel Quality Indicator (CQI) based at least partly upon a beamforming in a multi-antenna system, the method comprising:
estimating a channel vector by receiving a preamble signal beamformed by multiplying frequency tones of a frequency tone interval having a constant channel coefficient by different beamforming weights; and
calculating channel powers in the frequency tones carrying the preamble signal, calculating an arithmetic average, and quantizing a product of the arithmetic average and a number of transmit antennas.

13. The method of claim 12, wherein the channel vector is a linear summation of orthogonal basis vectors and given by the following equation:

$$\vec{h} = a_0 w_0^H + a_1 w_1^H + a_2 w_2^H + a_3 w_3^H + \ldots + a_i w_i^H,$$

where $\vec{h}$ denotes the channel vector, $a_i$ denotes a channel coefficient for an i-th frequency tone carrying the preamble signal, $w_i$ denotes an i-th beamforming weight vector, and $(\cdot)^H$ denotes a Hermitian operation.

14. The method of claim 13, wherein, using orthogonality of $\{w_i\}$, a complex constant $\{a_i\}$ is given by the following equation:

$$a_i = \vec{h} \cdot w_i \text{ for } i=0, 1, 2, 3,$$

where $\vec{h}$ denotes the channel vector, $a_i$ denotes a channel coefficient for an i-th frequency tone carrying the preamble signal, and $w_i$ denotes an i-th beamforming weight vector.

15. A transmitter for determining a Channel Quality Indicator (CQI) based at least partly upon in consideration of a beamforming in a multi-antenna system, the transmitter comprising:
a beam former for identifying frequency tone intervals having a constant channel coefficient in across a whole an entire frequency tone, multiplying the frequency tones of the frequency tone intervals having the constant channel coefficient by different beamforming weights.

16. The transmitter of claim 15, further comprising:
a beamforming vector unit for generating a set of the beamforming weights.

17. The transmitter of claim 15, wherein the beamforming weights have orthogonality.

18. The transmitter of claim 15, wherein a beam is formed by multiplying every three tones third tone by the beamforming weight according to a preset rule when the preamble is transmitted based on three sectors.

19. A receiver for determining a Channel Quality Indicator (CQI) based at least partly upon in consideration of a beamforming in a multi-antenna system, comprising:
a detector for estimating a channel vector by receiving a preamble signal beam formed by multiplying frequency tones of a frequency tone interval having a constant channel coefficient by different beamforming weights; and
a CQI calculator for calculating a Carrier-to-Interference-plus-Noise-Ratio (CINR) for the preamble signal.

20. The receiver of claim 19, wherein the channel vector is a linear summation of orthogonal basis vectors and given by the following equation:

$$\vec{h} = a_0 w_0^H + a_1 w_1^H + a_2 w_2^H + a_3 w_3^H + \ldots + a_i w_i^H,$$

where $\vec{h}$ denotes the channel vector, $a_i$ denotes a channel coefficient for an i-th frequency tone carrying the preamble signal, $w_i$ denotes an i-th beamforming weight vector, and $(\cdot)^H$ denotes a Hermitian operation.

21. The receiver of claim 20, wherein, using orthogonality of $\{w_i\}$, a complex constant $\{a_i\}$ is given by the following equation:

$$a_i = \vec{h} \cdot w_i \text{ for } i=0, 1, 2, 3,$$

where $\vec{h}$ denotes the channel vector, $a_i$ denotes a channel coefficient for an i-th frequency tone carrying these preamble signal, and $w_i$ denotes an i-th beamforming weight vector.

* * * * *